United States Patent

Tieleman et al.

[11] Patent Number: 5,816,904
[45] Date of Patent: Oct. 6, 1998

[54] METHOD AND APPARATUS FOR MAKING A CONTOURED OPENING CUT IN A POULTRY CARCASS

[75] Inventors: Rudolf J. Tieleman, Kansas City; William R. Sorensen, Blue Springs, both of Mo.

[73] Assignee: Johnson Food Equipment, Inc., Kansas City, Kans.

[21] Appl. No.: 786,769

[22] Filed: Jan. 21, 1997

[51] Int. Cl.[6] .................................................. A22C 21/00
[52] U.S. Cl. ............................................................ 452/120
[58] Field of Search ................................. 452/120, 106, 452/109, 176

[56] References Cited

U.S. PATENT DOCUMENTS

| | | |
|---|---|---|
| 4,136,421 | 1/1979 | Scheier et al. . |
| 4,257,142 | 3/1981 | Hathorn et al. . |
| 4,265,001 | 5/1981 | Hathorn et al. . |
| 4,266,322 | 5/1981 | van Mil . |
| 4,283,813 | 8/1981 | House ..................................... 452/106 |
| 4,339,849 | 7/1982 | van Mil ................................. 452/120 |
| 4,467,500 | 8/1984 | Olson ..................................... 452/120 |
| 4,486,920 | 12/1984 | Tieleman et al. ..................... 452/109 |
| 4,731,907 | 3/1988 | Tieleman ............................... 452/120 |
| 4,899,421 | 2/1990 | Van Der Eerden .................... 452/106 |
| 5,342,237 | 8/1994 | Kolkman ................................ 452/176 |

*Primary Examiner*—Willis Little
*Attorney, Agent, or Firm*—Hovey, Williams, Timmons & Collins

[57] ABSTRACT

Poultry carcasses hanging by their legs from a moving overhead conveying line are presented to corresponding carcass processing fixtures moving in a closed loop of travel around an upright axis. As each carcass is presented to its fixture, a holder on the fixture takes control of the carcass and stabilizes it with the breast facing outwardly. Once the carcass is stabilized, a knife on the fixture moves down into a previously prepared vent hole to a position slightly inside the body cavity. The knife then swings quickly outwardly to and beyond the sternum along an off-center, generally arched cutting path that runs much closer to one leg of the carcass than the other. The contour cut thus produced creates a single, disproportionately large tissue flap under the arch of the cut and on one side thereof which facilitates inspection and keeps the entire fat pad attached to one flap.

28 Claims, 5 Drawing Sheets

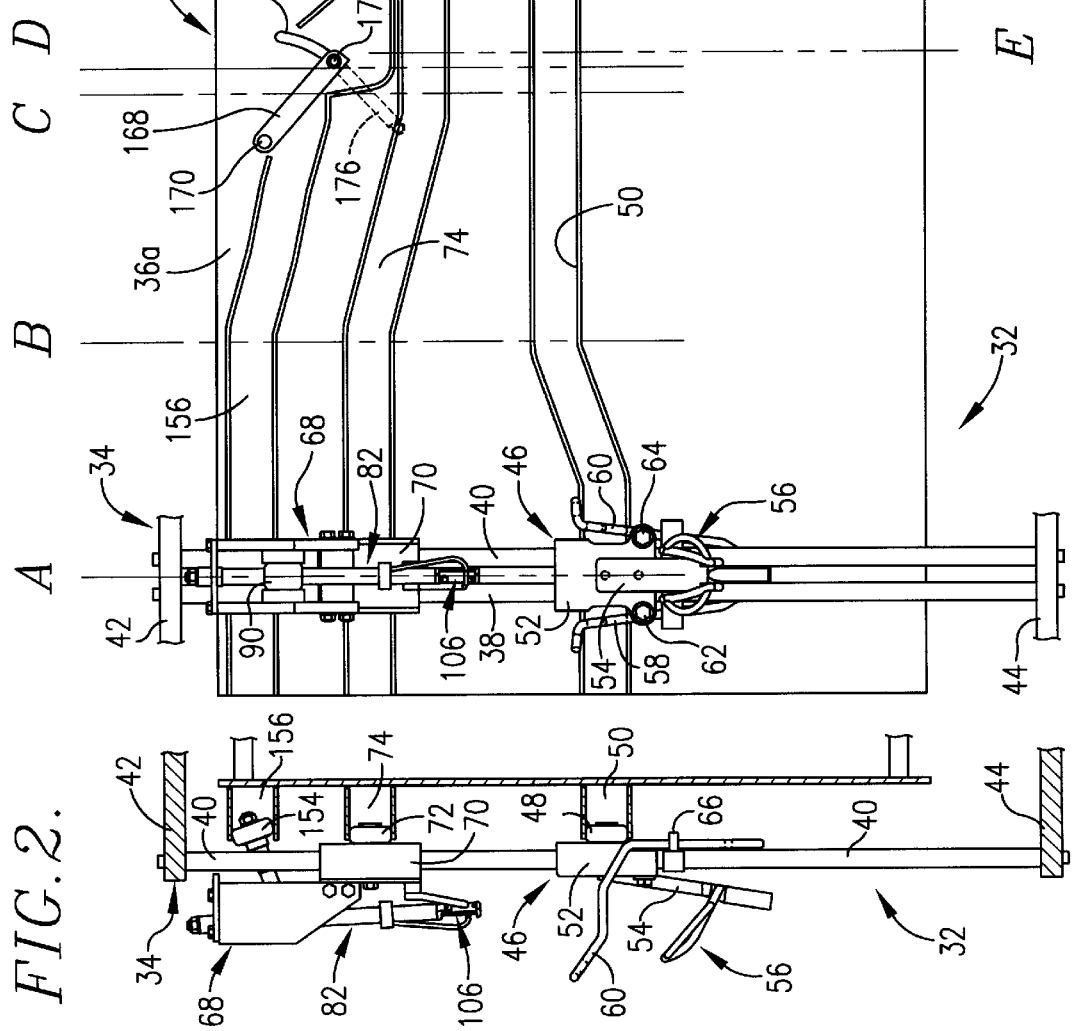

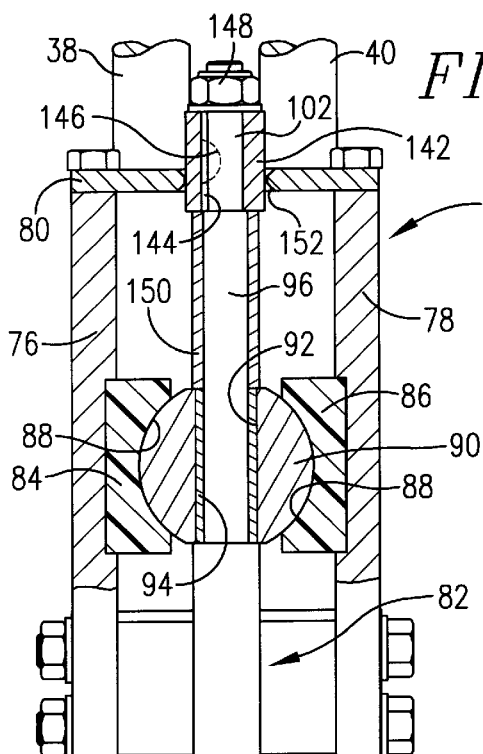
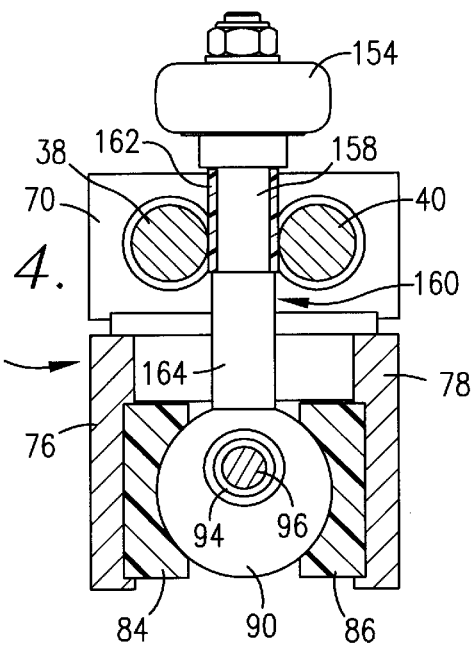
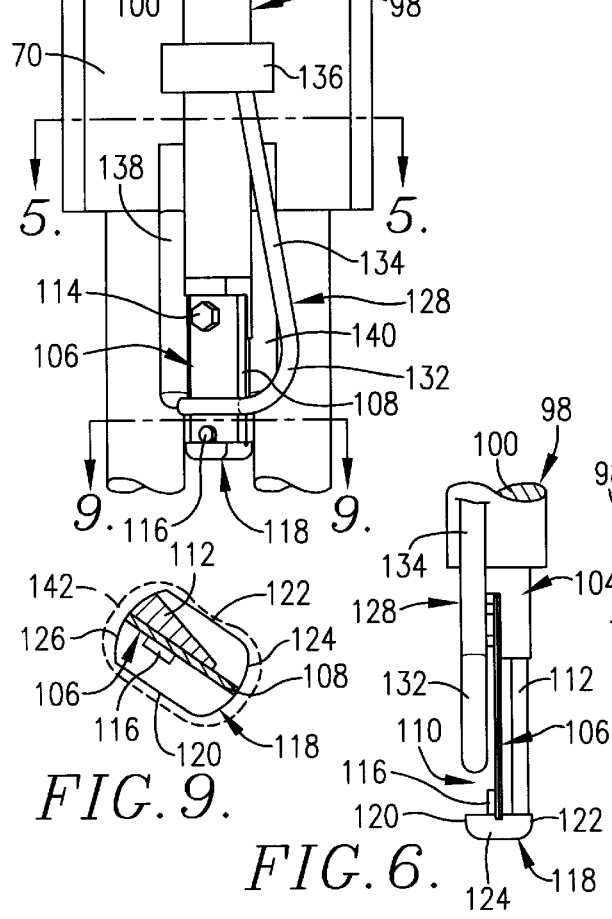
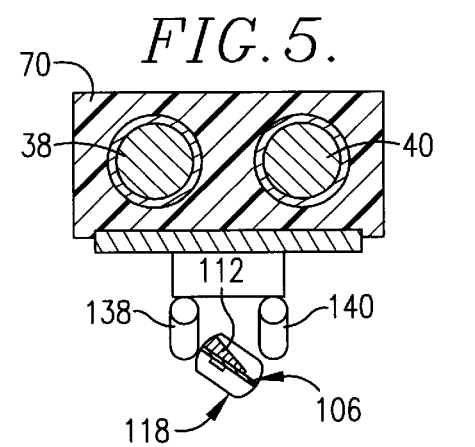
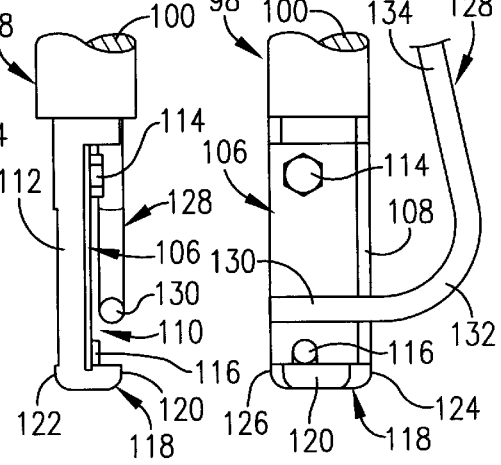

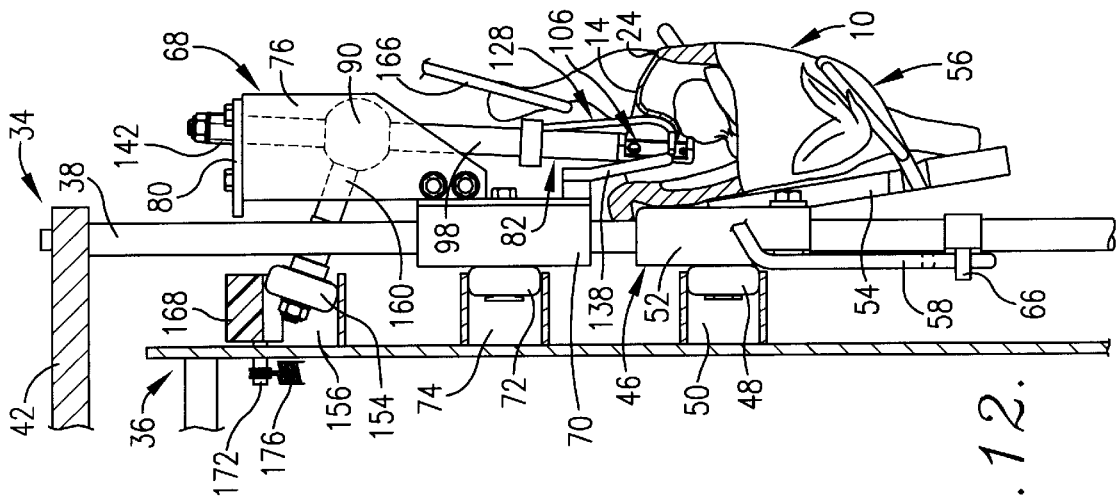
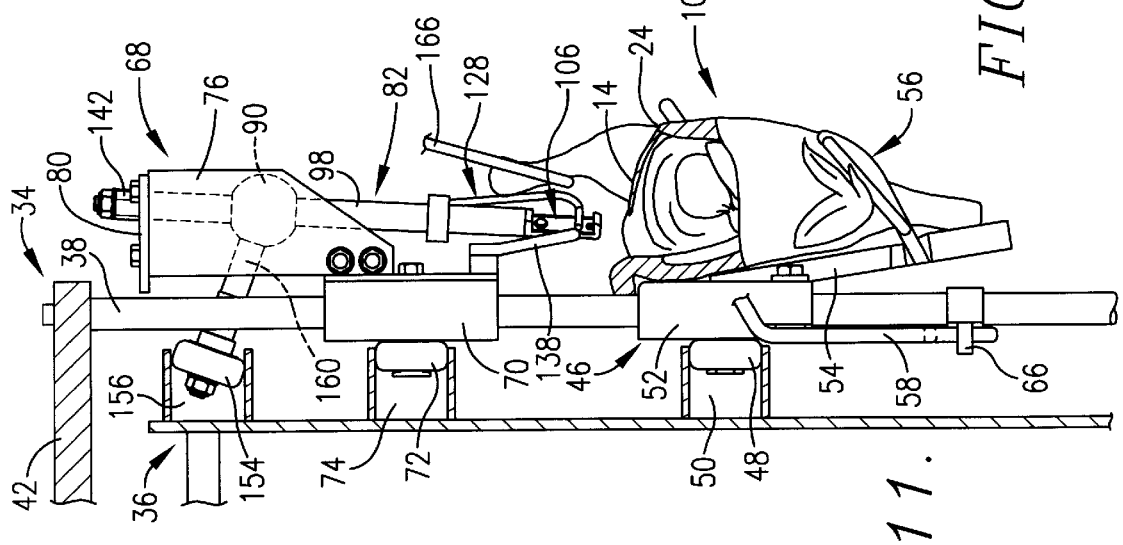
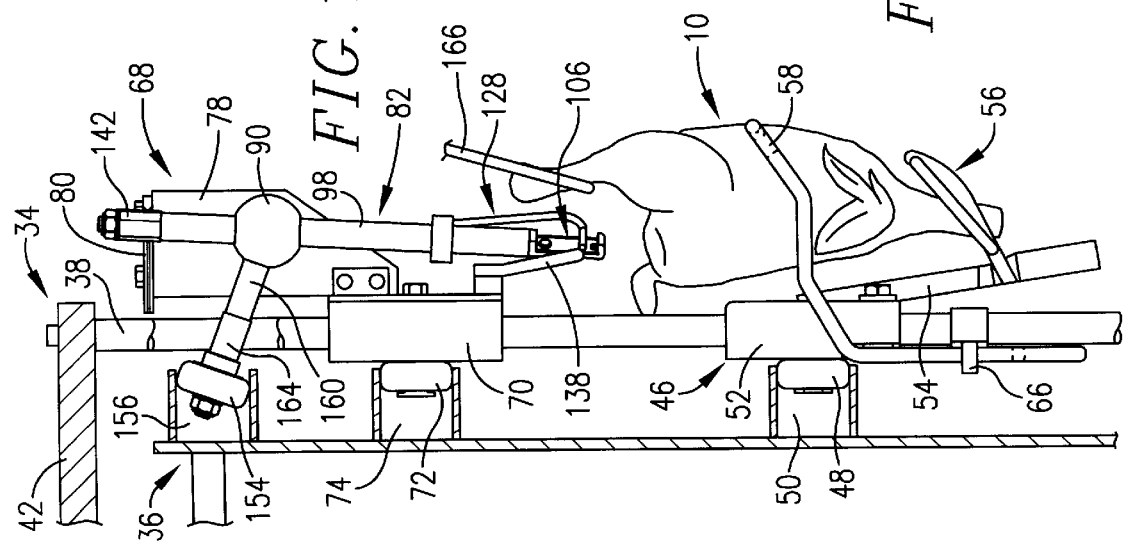

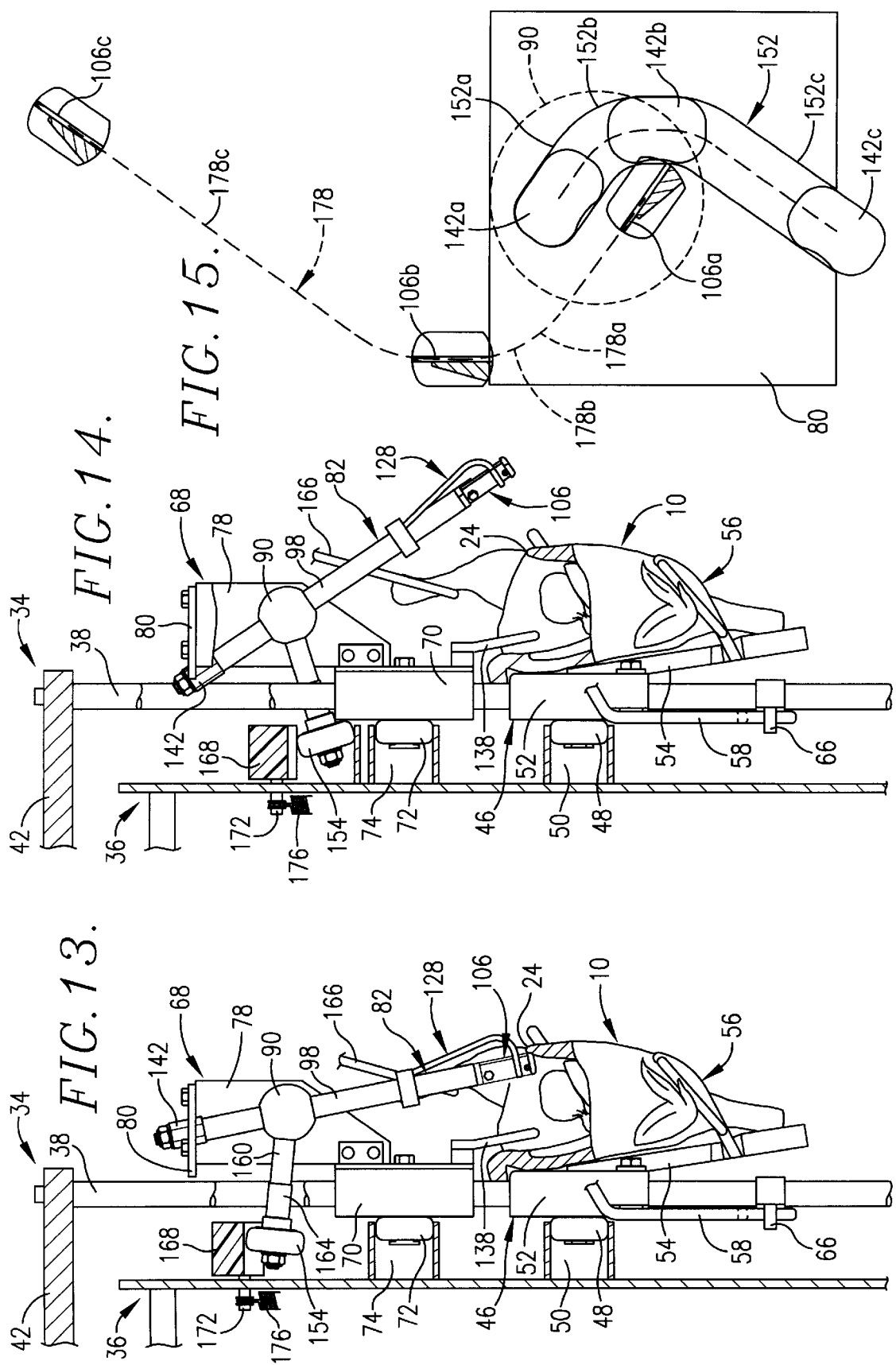

METHOD AND APPARATUS FOR MAKING A CONTOURED OPENING CUT IN A POULTRY CARCASS

TECHNICAL FIELD

The present invention relates to the processing of poultry carcasses and, more particularly, to making an arched, off-center opening cut into the body cavity through tissue at the posterior of the carcass so that a single, disproportionately large flap of tissue and fat is left on one side of the cut which may be folded back to expose and reveal the interior of the body cavity.

BACKGROUND

In order to permit the insertion of a tool into the body cavity of the carcass for withdrawing all or part of the entrails, a relatively large opening must be cut in the posterior of the carcass. Typically, such opening cut is made by first cutting around the vent of the carcass and pulling out the vent to leave a relatively small pilot hole. An example of a method and apparatus for accomplishing that function is disclosed in U.S. Pat. No. 3,958,303 titled "Method and Apparatus for Poultry Vent Removal" and assigned to the assignee of the present invention. See also U.S. Pat. No. 4,564,977 titled "Poultry Vent Removal Machine" assigned to the assignee of the present invention.

After the vent hole is made, another machine inserts a knife into the hole and slits the tissue from the hole to the sternum of the carcass in such a way that the cut is essentially centered between the two legs. The removal tool may then be inserted into the body cavity through the opening cut and the entrails withdrawn. An example of mechanism for accomplishing the opening cut is disclosed in U.S. Pat. No. 4,136,421 titled "Method and Apparatus for Opening the Body Cavity of Poultry", and U.S. Pat. No. 4,265,001 titled "Opening Method for Poultry Carcasses". Both of such patents are assigned to the assignee of the present invention. Examples of equipment for removing entrails from the opened carcass are found in U.S. Pat. Nos. 3,798,708; 3,082,028; 4,004,320; 4,019,222; 4,262,387; and 4,561,148, all of which are assigned to the assignee of the present invention.

Opening the body cavity with a centered cut produces two essentially equally sized flaps of tissue on opposite sides of the cut. In order to permit an inspector to look into a body cavity after evisceration, the two tissue flaps must be folded back in opposite directions so as to uncover the opening. Typically, this is done by hand as the inspector grasps the carcass, pulls back the tissue flaps, and looks into the body cavity.

SUMMARY OF THE PRESENT INVENTION

Accordingly, one important object of the present invention is to provide an opening cut to the body cavity that produces only a single large flap of tissue that, when folded back away from the cavity opening by the removal tool when it withdraws from the cavity, or by other means, will have sufficient mass and structural integrity to remain open without manual intervention by the inspector, thus permitting an at least essentially "hands free" inspection. Furthermore, by minimizing manual handling of the carcasses as they move along the processing line, the risks of cross-contamination from one carcass to another is also reduced. Preferably, the cut runs from the vent hole outwardly toward the sternum in a arcuate or contoured path passing close to the left leg of the carcass as the posterior is viewed in plan when the breast faces outwardly. Consequently, the entire pad of internal fat, which tends to be located near the right leg, remains attached to the single, large tissue flap created by the cut and can be folded back into an exposed condition with the flap when the opening is uncovered. This makes it easy to remove the fat pad in a single severing stroke during a later operation if desired, or the pad can be left in place at the discretion of the processor.

Although generally arched, the cut is actually comprised of a pair of diagonal segments at 90° to one another that are interconnected by a short, intermediate arcuate section. Thus, the cut starts diagonally from the vent hole toward the leg for a short distance, then turns 90° and proceeds in the opposite diagonal direction from the leg to the sternum through a final long, straight segment. To assure complete severance and to maintain accuracy, the cutting stroke is carried out as rapidly as possible, in a quick-snap action.

The mechanism for carrying out this process includes a generally upright knife blade that is initially inserted straight down into the vent hole for a short distance. As the knife then flips out toward the sternum, a cam forces the knife to take an off-center, arched path of travel next to the left leg. To force the cutting edge of the knife blade to always be facing in the right direction for severance, the cam causes the blade to rotate ninety degrees about the longitudinal axis of the knife as the knife moves along its off-center path. A special ball joint permits the knife to swing out, move sideways, and rotate about its longitudinal axis during the cutting stroke. A protective foot across the bottom and front corner of the knife shields the entrails and the sternum from being punctured or otherwise damaged by the knife.

BRIEF DESCRIPTION OF THE DRAWINGS

FIG. 1 is a front elevational view of a machine constructed in accordance with the principles of the present invention, the cam track assembly of the machine being illustrated in a flat pattern for the sake of clarity and only a single fixture of the machine being shown;

FIG. 2 is a side elevational view of the fixture and cam assembly with parts shown in cross-section for clarity;

FIG. 3 is an enlarged, fragmentary front elevational view of the opener head of the fixture with parts of the head broken away and shown in cross-section for clarity;

FIG. 4 is an enlarged horizontal cross-sectional view through the opener head taken just above the ball swivel joint of the knife and looking downwardly;

FIG. 5 is a transverse cross-sectional view of the head taken substantially along line 5—5 of FIG. 3, certain parts being removed for clarity;

FIG. 6 is an enlarged, fragmentary elevational view of the lower working end of the knife looking into the cutting edge thereof;

FIG. 7 is an enlarged, fragmentary rear elevational view thereof;

FIG. 8 is an enlarged, fragmentary side elevational view of the cutter;

FIG. 9 is an enlarged, fragmentary horizontal cross-sectional view through the lower end of the knife taken substantially along line 9—9 of FIG. 3 and illustrating in the phantom lines the cam follower at the upper end of the knife.

FIG. 10 is a fragmentary side elevational view of the fixture and cam track assembly showing a carcass being received by the holder of the fixture when the fixture is in a position corresponding substantially to position A of FIG. 1;

FIG. 11 is a fragmentary side elevational view similar to FIG. 10 but showing the carcass firmly gripped by the holder when the fixture is in position B of FIG. 1, the carcass being partially broken away to reveal internal details;

FIG. 12 is a similar fragmentary side elevational view showing the knife fully inserted into the vent hole of the carcass just prior to beginning the cutting stroke, the fixture being at position C in FIG. 1;

FIG. 13 is a side elevational view similar to FIGS. 10–12, but showing the knife part way through its cutting stroke with the cutting edge of the blade at the sternum of the carcass, the fixture being in position D of FIG. 1;

FIG. 14 is a side elevational view similar to FIGS. 10–13 but showing the cutter at the completion of its full stroke in which the cutting blade has passed on beyond the sternum and out of the body cavity, the fixture being at position E in FIG. 1;

FIG. 15 is a schematic top plan view of the fixture showing the path of travel of the upper cam follower of the knife through its cam track and corresponding positions of the knife blade along its cutting path;

DETAILED DESCRIPTION

Figure 16:
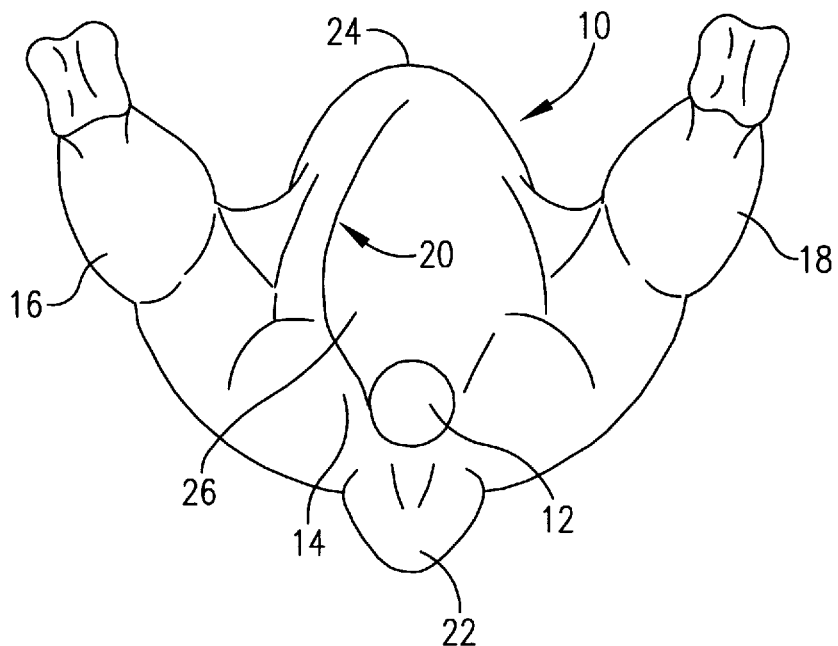
FIG. 16 is a top plan view of the posterior of the carcass illustrating the cut line of the opening cut.
Figure 17:
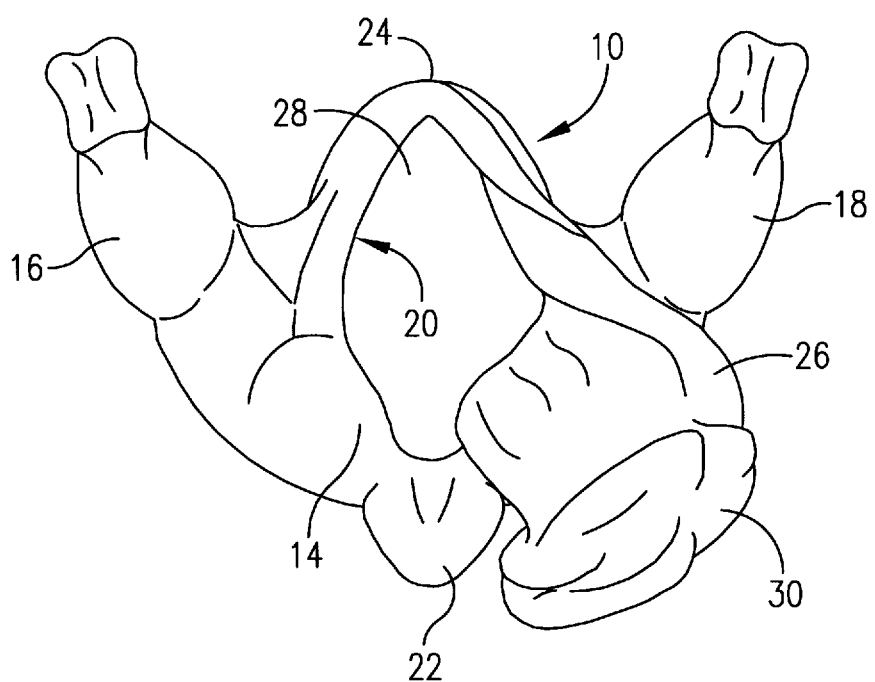
FIG. 17 is a top plan view of the posterior of the carcass after the cut has been completed and the flap of tissue with the fat pad attached has been folded back to one side to expose the open cavity.

FIGS. 16 and 17 illustrate a poultry carcass in which an opening cut to the body cavity has been made in accordance with the principles of the present invention. The carcass 10 has a vent hole 12 which has been cut in the posterior tissue 14 between the legs 16 and 18 in a prior processing operation. The opening cut 20 in accordance with the present invention commences at the vent hole 12 immediately adjacent the tail 22 and extends outwardly therefrom to the sternum 24. Between the tail 22 and the sternum 24 the cut line 20 is arched leftwardly viewing FIG. 16 so that the cut line runs much closer to the left leg 16 as viewed in FIG. 16 than the right leg 18. For the most part, the cut line 20 runs obliquely toward the left leg along bony structure at the posterior of the carcass during its initial segment of travel and then turns more directly toward the sternum and runs along the lower part of the rib cage. Consequently, compared to prior opening cuts which have been centered in the posterior tissue and which run essentially in a straight line from the vent hole to the sternum, the arched or "contoured" cut 20 produces a disproportionately large flap 26 of posterior tissue on one side of the cut, i.e., the right side as viewed in FIG. 16.

Thus, while providing an opening to and from the body cavity that is just as accessible for entail removal tools as in past designs, the present invention yields only a single tissue flap to be folded back to uncover the body cavity opening 28 as illustrated in FIG. 17. Moreover, the single flap 26 has attached to its underside the entire fat pad 30 from inside the cavity, which makes it easy to later remove the fat pad in a single step if such is desired by the processor.

In the illustrated embodiment, the opening cut is not totally arcuate, consisting instead of both arcuate and straight sections as will be explained further below. It is to be understood, however, that both completely arcuate and less than completely arcuate cuts are within the scope of the present invention, the primary objective being to make a non-centered, generally arched cut that runs much closer to one leg than the other so that a disproportionately large tissue flap is created on one side of the cut.

Turning to FIG. 1, an opening cut machine 32 for producing the opened carcass of FIGS. 16 and 17 is illustrated. Broadly speaking, the machine 32 includes a fixture 34 which moves from left to right viewing FIG. 1 along a cam track assembly 36 which has been illustrated in a flat layout for ease of understanding. Obviously, a number of the fixtures 34 will be provided on the commercial machine, and the cam track assembly 36 will be arranged in a closed loop. Preferably, the fixture 34 is closely similar to the fixture disclosed in U.S. Pat. No. 5,569,072 issued Oct. 29, 1996 and titled "Poultry Processing Mechanism having Carcass Stabilizer." Accordingly, the '072 patent is hereby incorporated by reference into the present specification.

Fixture 34 includes a pair of upright, parallel rods 38 and 40 that extend between and are fixed to upper and lower members 42 and 44 respectively. Members 38,40 are fixed to rotating parts of the machine so that the fixture 34 travels about the central upright axis of the machine. Fixture 34 also includes a carcass holder 46 that is vertically shiftable along the rods 38,40 as determined by a follower 48 projecting from the rear of the holder 46 and riding within a cam track 50 of the cam track assembly 36. Holder 46 includes a block 52 preferably constructed of a synthetic material commonly referred to as "PET-P", as well as a metal backstop 54 that projects outwardly and downwardly at an angle from the block 52. The backstop 54 is so disposed that the backbone of the carcass lies flatly up against the backstop 54 during processing operations to thereby stabilize the carcass and properly locate critical portions thereof for the application of processing operations.

The holder 46 also includes a shoulder yoke 56 projecting outwardly and upwardly from the backstop 32 generally adjacent the lower end thereof The yoke 56 is disposed to receive the neck of the carcass as illustrated in FIGS. 10–14 and to bear up against the shoulders of the carcass on opposite sides of the neck. The arcuate lower surface of yoke 56 serves as part of cam structure for operating the neck skin stretcher of a machine for making an access slit in the neck skin as disclosed in contemporaneously filed application Ser. No. 08/792,928 titled "Method and Apparatus for Preparing an Access Slit in the Neck of a Poultry Carcass" and assigned to the assignee of the present invention.

The block 52 of the holder 46 carries a pair of hip stabilizer arms 58 and 60 that pivot laterally about respective fore-and-aft pivots 62 and 64. The stabilizer arms 58 and 60 are designed to coact with a stationary, transverse cam bar 66 fixed to the upright guide rods 38,40 below the block 52 so that, as the block 52 rises and falls on the rods 38,40, the stabilizer arms 58,60 swing in and out about the pivots 62,64 to the extent determined by the interaction of the lower ends of the stabilizer arms and the cam bar 66. As illustrated in FIGS. 10–14, the upper ends of the stabilizer arms 42,44 undergird the hips of the carcass and clamp against opposite sides of the trunk of the carcass during the processing operation.

The fixture 34 also includes an opener head 68 which moves up and down along the guide rods 38,40 as the fixture 34 moves along the cam track assembly 36. Details of construction of the opener head 68 are illustrated in FIGS. 3–9, while overall aspects of the head 68 and its relationship to the cam track assembly 36 may be seen best in FIGS. 1, 2 and 10–15. The head 68 includes a slide block 70 similar to the block 52 associated with holder 46. The slide block 70 is slidably received upon the guide rods 38,40 for up and down travel to the extent determined by a cam follower 72 (FIGS. 10–14) 14) projecting from the back side of the block 70 and received within a cam track 74. A pair of laterally spaced, upstanding support plates 76 and 78 are fixed to the block 70 and project upwardly therefrom in front of the guide rods 38,40. The support plates 76,78 are interconnected across their upper ends by a top plate 80 that also serves as a cam plate for the opener knife as will be described below.

The support plates 76,78 serve as structure for supporting a knife unit 82 for movement in its special cutting motions during operation. In addition to following a contoured path of travel during its cutting stoke, the knife unit 82 must also rotate about its longitudinal axis to change the orientation of the cutting edge of the knife unit so that it is always facing forwardly with respect to its direction of movement at all points along its cutting path.

Accordingly, the support plates 76 and 78 are provided with a pair of laterally spaced apart, Nylon support cups 84 and 86 facing one another on the inside surfaces of the plates 76,78. The support cups 84 and 86 are aligned horizontally with one another and are each provided with a concave recess 88 that matingly receives the arcuate periphery of a swivel ball 90 forming a part of the knife unit 82. The support cups 84,86 retain the ball 90 against movement up and down or in and out relative to the plates 76,78, yet permit the ball 90 to swivel and revolve about its own center point.

The ball 90 has a bore 92 passing completely therethrough and into which is press-fitted a bushing 94. The bushing 94, in turn, rotatably receives a central reduced diameter portion 96 of an operating shaft 98 of the knife unit 82. The operating shaft 98 also has a larger diameter lower portion 100 commencing at the bottom end of the bushing 94 and extending down to the lower end of the unit 82, and a smaller diameter upper portion 102 in the vicinity of the top plate 80. The lower portion 100 terminates at its lower end in a blade carrier 104 as shown in detail in FIGS. 6–9.

The carrier 104 is designed to receive and support an upstanding blade 106 having a vertical cutting edge 108 which may be scalloped if desired. The carrier 104 is configured to present a notch 110 (see FIG. 7 in particular) into which the upstanding blade 106 is received, and the notch 110 is provided with an upright, transversely generally wedge-shaped back wall 112 (FIG. 9) against which the blade 106 is clamped by a mounting screw 114. A locating pin 116 projecting outwardly from the back wall 112 adjacent its lower end passes through a suitable hole or slot in the blade 106 to properly locate and stabilize the blade. A protective shoe 118 at the bottom of the notch 110 covers the bottom extremity of the blade 106 and extends laterally outwardly beyond the latter in opposite directions. The shoe 118 has opposite parallel sides 120 and 122 (FIG. 9), as well as rounded front and rear ends 124 and 126. A generally J-shaped, knife guard rod 128 has its lower horizontal leg 130 running alongside the blade 106 generally adjacent the lower end thereof, while its arcuate bight portion or nose 132 projects forwardly beyond the cutting edge 108. The upright leg 134 of the guard 128 extends upwardly beyond the cutting edge 108 and is angled back toward the longitudinal axis of the knife shaft 98 until terminating at and being fixedly secured to a collar 136 on the lower shaft portion 100.

As shown particularly in FIGS. 3, 5 and 10–14, the slide block 70 is provided with a pair of laterally spaced apart, downwardly and outwardly projecting, rigid fingers 138 and 140 that enter the body cavity of the carcass with the knife 82 during the processing operation. The two fingers 138,140 serve as additional stabilizing means for maintaining the back of the carcass up against the back stop 54 while the knife 82 is operating. The fingers 138,140 terminate at their lower ends at a point which is approximately mid-way down the knife blade 106 when the knife 82 is in its home position as illustrated in FIGS. 1–3, 10 and 11.

As illustrated best in FIG. 3, the reduced diameter upper portion 102 of the knife operating shaft 98 has a cam follower 142 fixed thereto, such as by a key slot 144 and key 146. The uppermost end of the reduced diameter portion 102 is threaded so as to threadably receive a clamping nut 148 that holds the follower 142 down against a shoulder formed at the intersection between the shaft portions 96 and 102. A spacer tube 150 is disposed between the bushing 92 and the follower 142 and houses the intermediate shaft portion 96.

The follower 142 is generally rectangular with rounded corners as shown in the schematic illustration of FIG. 15 and in phantom lines in FIG. 9 and travels along a generally J-shaped cam slot 152 (FIGS. 3 and 15) in the top plate 80. The generally rectangular configuration for the follower 142 causes the opposite sides thereof to engage with and be maneuvered by the lateral confines of the cam slot 152, thus turning the follower 142 and the operating shaft 98 in a rotational movement of 90° as the follower 142 moves between opposite ends of the slot 152. It will be seen, therefore, that the cam slot 152 and the follower 142 establish both the rotational orientation of the knife blade 106 and its the lateral position during the cutting stroke. Other means now to be described determine the position of the knife blade 106 in a fore-and-aft sense between the vent hole and the sternum.

To determine the position of the cutter blade 106 in a fore-and-aft sense along its path of swinging travel the knife unit 82 is provided with a cam follower 154 attached to the rear of the swivel ball 90 and riding within an upper cam track 156 of the cam track assembly 36. As shown in FIG. 4, the cam follower 154 is rotatably mounted on the outer end of a reduced diameter portion 158 of an arm 160 fixed to and projecting rearwardly from the swivel ball 90. The reduced diameter portion 158 of the arm 160 loosely carries a Nylon wear tube 162 which fits between the follower 154 and an enlarged diameter portion 164 of the arm 160. The Nylon tube 162 is confined between the two guide rods 38 and 40 so that the arm 160 is held against movement in a direction parallel to the cam track 156 but is permitted to swing vertically to the extent determined by the track 156.

OPERATION

FIGS. 10–15 illustrate the use and operation of the present invention. In those figures, the poultry carcass 10 is shown suspended by its legs from a shackle 166 forming part of an overhead conveying line that moves the carcasses in spaced succession through the processing plant. The conveying line and the processing machine 32 (FIG. 1) are disposed such that the paths of travel of the carcasses 10 and the fixtures 34 intersect one another at the machine 32. As the fixtures 34 move in their closed loop of travel, each fixture is matched up with one of the carcasses on the conveying line until the opening process is completed, at which time the conveying line departs from the machine 32 and moves on to the next processing station.

It will be understood that while only a single processing function has been illustrated as taking place on the machine 32, in the commercial version one or more additional processing operations might be simultaneously performed on each carcass once it has been securely located and stabilized on a fixture. For example, in addition to the opening cut operation which takes place at the posterior end of the carcass pursuant to the present invention, an access slit might be simultaneously prepared at the head end of the carcass in accordance, for example, with the principles disclosed and claimed in concurrently filed, co-pending application Ser. No. 08/792,928 titled "Method and Apparatus for Preparing an Access Slit in the Neck of a Poultry Carcass" and assigned to the assignee of the present invention.

As the carcass 10 swings into the moving fixture 34 as shown in FIG. 10, the fixture 34 is substantially at position A of FIG. 1. In this position the opener head 68 is fully raised, while the carcass holder 46 is fully lowered. Similarly, the knife unit 82 is in its home position centered left-to-right on the fixture 34, is swung fully in toward the guide rods 38,40 in an in-and-out direction, and is disposed with the cutting edge 108 of blade 106 angled to the left at a 55° degree angle as viewed in top plan looking downwardly on the posterior of the carcass as in FIG. 15. In FIG. 15, the home position for the blade 106 is designated by the numeral 106a. Likewise, the home position for the cam follower 142 is designated by the numeral 142a in FIG. 15. Thus, at this time, the knife blade 106 and the follower 142 are close to being in vertical registration with one another As the fixture 34 moves from position A to position B in FIG. 1, the top two tracks 156 and 174 remain flat so that there is no change in the position of the head 68 or the knife unit 82. However, because the lower track 50 is rising at this time, the holder 46 moves upwardly on the guide rods 38,40, causing the hip stabilizer arms 58,60 to swing inwardly and upwardly, undergirding the hips of the carcass and clamping against opposite sides of the trunk. The stabilized condition of the carcass corresponding to position B of FIG. 1 is illustrated in FIG. 11.

As the fixture 34 travels from position B to position C in FIG. 1, the knife unit 82 is forced straight down into the vent hole 12 to the standby position illustrated in FIG. 12. This is accomplished because the top two tracks 156 and 74 descend during this interval, while the lower track 50 remains flat. During such insertion of the knife blade 106 into the body cavity of the carcass, the protective shoe 118 and the knife guard 128 keep the knife blade 106 from puncturing, severing or otherwise damaging the entrails within the body cavity. The knife blade 106 and the cam follower 142 remain in positions 106a and 142a of FIG. 15 at this time. Also, it will be noted that retaining fingers 138 and 140 have slipped down into the vent hole 12 close to the tail 22 and along the back of the bird.

The contoured opening cut 20 illustrated in FIGS. 16 and 17 is performed as the fixture 34 leaves position C in FIG. 1 and travels through positions D and E. While the two lower cam tracks 74 and 50 remain flat during this interval, the upper cam track 156 drops off dramatically to cause the knife unit 82 to snap-out suddenly to its fully operated position of FIG. 14. During the course of this snap-out action, the contour cut 20 of FIG. 16 and 17 is completely made in the posterior tissue 14.

The drop-off in upper cam track 156 causes the upper follower arm 164 to act like a crank or lever on the swivel ball 90 and pivot the ball about a horizontal, transverse axis parallel to the path of travel of the fixture. This swings the knife unit 82 outwardly. At the same time, the J-shaped cam slot 152 (FIG. 15) and the cam follower 142 at the upper end of the knife unit 82 prevent the knife from simply swinging straight out from the vent hole, forcing the knife to divert first to the left viewing FIG. 15 and then to the right. Because the knife blade 106 is swinging left and then right at the same time it is swinging out away from the back stop 54, the path of travel of the blade 106 assumes a generally arched configuration as depicted in FIG. 15, such path of travel being denoted by the phantom line 178 and corresponding closely with the configuration of the cut line 20 on the carcass 10 of FIGS. 16 and 17.

The follower 142 initially leaves its home position at the end of the short leg 152a of cam slot 152 and travels in a straight line until reaching the intermediate, arcuate leg 152b of the slot where it is forced to change directions. In position 142b, the follower is at the mid-point of its directional change. Such movement of the follower from position 142a to position 142b correspondingly swings the knife 106 along the short, diagonal, straight leg 178a of its path 178. As the cam follower 142 moves around curved section 152b, the knife 106 moves around curved path section 178b. Position 142b of the follower 142 corresponds with position 106b of the knife blade 106.

As follower 142 completes its movement around the curved section 152b of slot 152, the follower enters the long straight section 152c, causing the knife blade 106 to correspondingly move around the curved portion 178b of its path and enter the long, straight diagonal section 178c that is at right angles to the initial path section 178a. The final position 142c of follower 142 at the end of slot section 152c corresponds to the final position 106c of the knife blade 106 at the far end of path section 178c. This fully operated knife position 106c corresponds to the position illustrated in FIG. 14, where the knife blade 106 has completed the cut 20 (FIGS. 16, 17) and has swung up and out of the body cavity.

After the swing cut by the blade 106 is completed, the knife unit 82 is gradually returned back to its standby position and the head 68 is raised to its home position as the upper two cam tracks 156 and 74 ascend as illustrated in FIG. 1. The opened carcass remains fully stabilized and under the control of the holder 46 at this time as the lower cam track 50 stays flat. As the end of the cam track assembly 36 is reached, the lower cam track 50 descends slightly to cause holder 46 to release the carcass while the upper tracks 156 and 74 remain flat. Consequently, the conveyor line may swing the opened carcass off the machine at this time and move it onto the next processing station, while the fixture 34 completes its loop of travel around the machine and once again becomes ready to receive a carcass at position A of FIG. 1.

In order to assure that the snap-out action of the knife unit 82 is completed instantaneously, the upper cam track 156 is provided with a special overhead accelerator bar 168 that bears against the top of the follower 154 as the fixture approaches position C and moves on through positions D and E of FIG. 1. The accelerator bar 168 is swingably attached to the support plate 36a of cam track assembly 36 at pivot 170 (FIG. 1). A transverse guide pin 172 at the leading end of the bar 168 is received within an arcuate slot 174 (FIG. 1) in the support plate 36a. Behind the support plate 36a, the guide pin 172 is connected to a tension spring 176 that is anchored at its lower end to the support plate 36a. Thus, the accelerator bar 168 is yieldably biased toward its actuated position of FIG. 1 in which the guide pin 172 is located at the lowermost end of the guide slot 174. Consequently, as the follower 154 moves down the cam track 156 and approaches position C in FIG. 1, it engages the accelerator bar 168 and swings it upwardly in a counter-clockwise direction viewing FIG. 1 to load up the tension spring 176. Then, as the follower 154 encounters the drop-off through positions C, D and E, the stored up spring force associated with the accelerator bar 168 pops the follower 154 down to the bottom of the drop-off to cause the knife unit 82 to snap-out to its operated position.

When the carcass is conveyed away from the opening cut machine 32 the carcass has an off-center, contour cut 20 from the tail 22 to the sternum 24 as illustrated in FIG. 16. Consequently, an entrail removal tool may then be forced down into the body cavity through the yieldable, large skin flap 26 created by the contour cut 20. As the removal tool withdraws from the body cavity with the entrails in hand, the flap 26 is forced open to uncover the opening 28 beneath the flap 26. To the extent the flap 26 is not fully opened by the withdrawing removal tool, a separate mechanism may be utilized to complete the folding back of the flap 26 until it assumes the position generally corresponding to FIG. 17. It will be seen that in the position of FIG. 17, the fat pad 30 on the underside of the flap 26 hangs off the right side of the carcass as FIG. 17 as viewed, the mass and structural and integrity of pad 30 helping to maintain the flap 26 fully opened once it has been folded back.

Having thus described the invention, what is claimed as new and desired to be secured by Letters Patent is:

1. A device for making an access cut in posterior tissue between the legs of a poultry carcass comprising:

a knife;

means for inserting the knife into a hole in the tissue; and apparatus for actuating the inserted knife in a cutting stroke that extends generally between the hole and the breast of the carcass, said apparatus being operable to cause the knife to travel closer to one leg of the carcass than the other as the knife moves through said cutting stroke whereby to produce a disproportionately large flap of tissue on one side of the cut.

2. A device for making an access cut as claimed in claim 1, said cutting stroke being arched with said disproportionately large flap of tissue located under the arch.

3. A device for making an access cut as claimed in claim 1, said apparatus causing the knife to travel toward the breast and away from the hole as the knife travels in said cutting stroke.

4. A device for making an access cut as claimed in claim 1, said apparatus including an arched guide, a follower associated with said knife, and an actuator for moving the knife through said stroke with the follower in engagement with said guide, said knife having a swivel mount that permits the knife to swing laterally during said stroke to the extent determined by the guide.

5. A device for making an access cut as claimed in claim 4, said knife having a cutting edge, said knife being mounted for rotational positioning about an axis extending generally parallel to the direction of movement of the knife during its insertion into the hole in the posterior tissue, said follower and said guide being configured to cause the knife to rotate about said axis to the extent necessary to maintain the cutting edge facing forwardly with respect to the direction of travel of the knife in its cutting stroke.

6. A device for making an access cut as claimed in claim 5, said actuator including a spring operably coupled with the knife for snapping the knife through its cutting stroke.

7. A device for making an access cut as claimed in claim 6, said knife including a blade and a carrier for supporting the blade, said carrier including a protective shoe at a lower corner of the blade that covers said corner of the blade.

8. A device for making an access cut as claimed in claim 7, said carrier further having a generally J-shaped guard rod disposed to prevent engagement of the cutting edge of the blade with entrails within the carcass during the insertion stroke and cutting stroke of the knife, said guard rod having a front leg spaced forwardly from the cutting edge and extending generally diagonally downwardly and forwardly therefrom, and a lower leg that extends rearwardly from a lower end of the front leg into a position alongside the blade.

9. A device for making an access cut as claimed in claim 1, said apparatus including a spring operably coupled with the knife for snapping the knife through its cutting stroke.

10. A device for making an access cut as claimed in claim 1; and retaining finger structure movable with the knife during insertion of the latter into the hole in the tissue for entering the hole near the back of the carcass for holding the carcass during the cutting stroke of the knife.

11. A device for making an access cut as claimed in claim 6; and retaining finger structure movable with the knife during insertion of the latter into the hole in the tissue for entering the hole near the back of the carcass for holding the carcass during the cutting stroke of the knife.

12. In a method of making an access cut at the posterior of a poultry carcass to open the body cavity of the carcass for further processing, the improvement comprising:

inserting a knife into a hole in posterior tissue between the legs of the carcass; and actuating the knife in a cutting stroke that extends between the hole and the breast and runs closer to one leg of the carcass than the other whereby to produce a disproportionately large flap of tissue on one side of the cut.

13. In a method of making an access cut as claimed in claim 12, said cutting stroke being arched with said disproportionately large flap of tissue located under the arch.

14. In a method of making an access cut as claimed in claim 12, said knife traveling toward the breast and away from the hole as the knife travels in said cutting stroke.

15. In a method of making an access cut as claimed in claim 12, said actuating step including snapping the knife quickly through its cutting stroke compared to its speed during insertion into the hole.

16. In a method of making an access cut as claimed in claim 15, said cutting stroke being arched with said disproportionately large flap of tissue located under the arch.

17. In a method of making an access cut as claimed in claim 16, said knife traveling toward the breast and away from the hole as the knife travels in said cutting stroke.

18. In a machine for making an access cut into the body cavity of each carcass in a series of poultry carcasses suspended by their legs from and moving along an overhead conveying line, the improvement comprising:

a plurality of fixtures movable in spaced succession along a path of travel disposed to intersect the path of travel of the carcasses along the conveying line, each of said fixtures being disposed to travel in concert with one of the carcasses as the access cut is prepared in the carcass;

a holder associated with each fixture for holding a carcass essentially motionless on the fixture with its breast facing outwardly while the access cut is being made, said holder including means for maintaining the legs of the carcass spread apart to expose posterior tissue between the legs of the carcass;

a knife on each fixture respectively, movable along a path of travel disposed to insert the knife into a hole in the posterior tissue of the carcass on the fixture;

means for effecting said insertion of the knife into the carcass; and apparatus for actuating the inserted knife in a cutting stroke that extends generally outwardly away from the fixture so that the knife moves generally between the hole and the breast during the cutting stroke, said apparatus being operable to cause the knife to travel closer to one leg of the carcass than the other as the knife moves through said cutting stroke whereby to produce a disproportionately large flap of tissue on one side of the cut.

19. In a machine as claimed in claim 18, said cutting stroke being arched with said disproportionately large flap of tissue located under the arch.

20. In a machine as claimed in claim 18, said apparatus causing the knife to travel toward the breast and away from the hole as the knife travels in said cutting stroke.

21. In a machine as claimed in claim 18, said apparatus including an arched guide on the fixture, a follower on said knife, and an actuator for moving the knife through said stroke with the follower in engagement with said guide, said knife having a swivel mount that permits the knife to swing laterally during said stroke to the extent determined by the guide.

22. In a machine as claimed in claim 21, said knife having a cutting edge, said knife being mounted for rotational positioning about an axis extending generally parallel to the direction of movement of the knife during its insertion into the hole in the posterior tissue, said follower and said guide being configured to cause the knife to rotate about said axis to the extent necessary to maintain the cutting edge facing forwardly with respect to the direction of travel of the knife in its cutting stroke.

23. In a machine as claimed in claim 22, said actuator including a spring operably coupled with the knife for snapping the knife through its cutting stroke.

24. In a machine as claimed in claim 23, said apparatus causing the knife to travel toward the breast and away from the hole as the knife travels in said cutting stroke.

25. In a machine as claimed in claim 23, said knife including a blade and a carrier for supporting the blade, said carrier including a protective shoe at a lower corner of the blade that covers said corner of the blade.

26. In a machine as claimed in claim 25, said carrier further having a generally J-shaped guard rod disposed to prevent engagement of the cutting edge of the blade with entrails within the carcass during the insertion stroke and cutting stroke of the knife, said guard rod having a front leg spaced forwardly from the cutting edge and extending generally diagonally downwardly and forwardly therefrom, and a lower leg that extends rearwardly from a lower end of the front leg into a position alongside the blade.

27. In a machine as claimed in claim 18, said apparatus including a spring operably coupled with the knife for snapping the knife through its cutting stroke.

28. In a poultry processing method, the improvement comprising:

conveying a poultry carcass by its legs along a conveying line;

inserting a knife into a hole in posterior tissue between the legs of the carcass while the carcass is moving;

actuating the knife in a cutting stroke that extends between the hole and the breast and runs closer to one leg of the carcass than the other whereby to produce a single disproportionately large flap of tissue on one side of the cut;

inserting a removal tool into the body cavity of the carcass through the cut while the carcass is moving and withdrawing entrails from the cavity through the cut;

causing the flap of tissue to be folding back away from the cut to reveal the interior of the cavity; and visually examining the revealed interior of the cavity while the flap is folded back.

* * * * *